US012566924B2

(12) United States Patent
Kim et al.

(10) Patent No.: US 12,566,924 B2
(45) Date of Patent: Mar. 3, 2026

(54) APPARATUS FOR EVALUATING AND IMPROVING RESPONSE, METHOD AND COMPUTER READABLE RECORDING MEDIUM THEREOF

(71) Applicant: Hyperconnect LLC, Seoul (KR)

(72) Inventors: Beom Su Kim, Seoul (KR); Bu Ru Chang, Seoul (KR); Seung Ju Han, Seoul (KR)

(73) Assignee: Hyperconnect LLC, Dallas, TX (US)

( * ) Notice: Subject to any disclaimer, the term of this patent is extended or adjusted under 35 U.S.C. 154(b) by 520 days.

(21) Appl. No.: 18/051,429

(22) Filed: Oct. 31, 2022

(65) Prior Publication Data

US 2023/0229864 A1     Jul. 20, 2023

(30) Foreign Application Priority Data

Jan. 14, 2022    (KR) ........................ 10-2022-0005922
Jul. 8, 2022    (KR) ........................ 10-2022-0084436

(51) Int. Cl.
  *G06F 40/35*      (2020.01)
  *G06F 40/56*      (2020.01)
  *G06N 3/08*       (2023.01)

(52) U.S. Cl.
  CPC .............. *G06F 40/35* (2020.01); *G06F 40/56* (2020.01)

(58) Field of Classification Search
  CPC ......... G06F 40/35; G06F 40/56; G06N 20/00; G06N 3/08
  See application file for complete search history.

(56) References Cited

U.S. PATENT DOCUMENTS 6,571,234  B1    5/2003   Knight et al.
6,731,307  B1    5/2004   Strubbe et al.
6,735,615  B1    5/2004   Iwayama et al.
6,804,647  B1    10/2004  Heck et al.
6,804,675  B1    10/2004  Knight et al.
7,277,855  B1    10/2007  Acker et al.
7,685,237  B1    3/2010   Weaver et al.
             (Continued)

FOREIGN PATENT DOCUMENTS

CN         112541060 A       3/2021
JP         2003202885 A      7/2003
             (Continued)

OTHER PUBLICATIONS

Du et al. "Boosting Dialog Response Generation" Proceedings of the 57th Annual Meeting of the Association for Computational Linguistics, pp. 38-43, Florence, Itlay, Jul. 28-Aug. 2, 2019 (Year: 2019).*
             (Continued)

*Primary Examiner* — Daniel C Washburn
*Assistant Examiner* — Penny L Caudle
(74) *Attorney, Agent, or Firm* — Patent Capital Group

(57)        ABSTRACT

Provided is an apparatus for evaluating and improving responses, and a method and a computer readable recording medium thereof. The apparatus for evaluating responses according to the present disclosure obtains cluster classifying information for training responses, and based on distribution of clusters to which test responses output from the dialogue generation model are classified, evaluate semantic diversity of the responses output from the dialogue generation model.

14 Claims, 11 Drawing Sheets

(56) References Cited

U.S. PATENT DOCUMENTS

| | | | |
|---|---|---|---|
| 10,176,819 B2 | 1/2019 | Sun et al. | |
| 10,930,263 B1 | 2/2021 | Mahyar | |
| 11,194,973 B1 * | 12/2021 | Goel | G06N 3/08 |
| 11,615,777 B2 | 3/2023 | Ahn et al. | |
| 11,645,547 B2 | 5/2023 | Tian et al. | |
| 2002/0120450 A1 | 8/2002 | Junqua et al. | |
| 2004/0111271 A1 | 6/2004 | Tischer | |
| 2005/0144247 A1 | 6/2005 | Christensen et al. | |
| 2006/0149558 A1 | 7/2006 | Kahn et al. | |
| 2006/0210034 A1 | 9/2006 | Beadle et al. | |
| 2006/0235932 A1 | 10/2006 | Celi, Jr. et al. | |
| 2007/0005754 A1 | 1/2007 | Horvitz et al. | |
| 2007/0071206 A1 | 3/2007 | Gainsboro et al. | |
| 2008/0082333 A1 | 4/2008 | Nurminen et al. | |
| 2008/0147385 A1 | 6/2008 | Nurminen et al. | |
| 2008/0183473 A1 | 7/2008 | Nagano et al. | |
| 2008/0207242 A1 | 8/2008 | Ekberg | |
| 2008/0235024 A1 | 9/2008 | Goldberg et al. | |
| 2009/0037179 A1 | 2/2009 | Liu et al. | |
| 2009/0171657 A1 | 7/2009 | Tian et al. | |
| 2009/0177473 A1 | 7/2009 | Aaron et al. | |
| 2009/0204510 A1 | 8/2009 | Hwang | |
| 2010/0161327 A1 | 6/2010 | Chandra et al. | |
| 2012/0189272 A1 | 7/2012 | Kunigita et al. | |
| 2012/0226500 A1 | 9/2012 | Balasubramanian et al. | |
| 2013/0332167 A1 | 12/2013 | Kilgore | |
| 2014/0195227 A1 | 7/2014 | Rudzicz et al. | |
| 2014/0303958 A1 | 10/2014 | Lee et al. | |
| 2015/0379654 A1 | 12/2015 | Deshmukh et al. | |
| 2016/0005403 A1 | 1/2016 | Agiomyrgiannakis et al. | |
| 2016/0036962 A1 | 2/2016 | Rand | |
| 2016/0104474 A1 | 4/2016 | Bunn et al. | |
| 2016/0203827 A1 | 7/2016 | Leff et al. | |
| 2016/0379643 A1 | 12/2016 | Ito et al. | |
| 2017/0171509 A1 | 6/2017 | Huang et al. | |
| 2017/0171599 A1 | 6/2017 | Peng | |
| 2017/0249953 A1 | 8/2017 | Yassa et al. | |
| 2017/0301340 A1 | 10/2017 | Yassa et al. | |
| 2018/0048865 A1 | 2/2018 | Taylor et al. | |
| 2018/0063556 A1 | 3/2018 | Kalmanson et al. | |
| 2018/0090126 A1 | 3/2018 | Peterson et al. | |
| 2018/0130471 A1 | 5/2018 | Trufinescu et al. | |
| 2018/0204576 A1 | 7/2018 | Dhoot et al. | |
| 2018/0316964 A1 | 11/2018 | Dillon et al. | |
| 2019/0044985 A1 | 2/2019 | Jo et al. | |
| 2019/0079941 A1 | 3/2019 | Sarkar et al. | |
| 2019/0108242 A1 | 4/2019 | Liu et al. | |
| 2019/0221225 A1 | 7/2019 | Bricklin et al. | |
| 2019/0251952 A1 | 8/2019 | Arik et al. | |
| 2019/0334842 A1 | 10/2019 | Sato | |
| 2019/0354594 A1 | 11/2019 | Foster et al. | |
| 2020/0013422 A1 | 1/2020 | Matkin | |
| 2020/0082807 A1 | 3/2020 | Kim et al. | |
| 2020/0197810 A1 | 6/2020 | Kung et al. | |
| 2020/0265829 A1 | 8/2020 | Liu et al. | |
| 2020/0395008 A1 | 12/2020 | Cohen et al. | |
| 2021/0020161 A1 | 1/2021 | Gao | |
| 2021/0043187 A1 | 2/2021 | Ahn et al. | |
| 2021/0217404 A1 | 7/2021 | Jia et al. | |
| 2022/0199068 A1 | 6/2022 | Ahn et al. | |
| 2022/0246136 A1 | 8/2022 | Yang et al. | |
| 2023/0077528 A1 | 3/2023 | Erdenee et al. | |
| 2023/0080930 A1 | 3/2023 | Seo et al. | |
| 2023/0154453 A1 | 5/2023 | Erdenee et al. | |
| 2023/0215418 A1 | 7/2023 | Ahn et al. | |
| 2023/0229964 A1 | 7/2023 | Kim et al. | |

FOREIGN PATENT DOCUMENTS

| | | | |
|---|---|---|---|
| JP | 2019179257 A | 10/2019 | |
| JP | 2020160319 A | 10/2020 | |
| KR | 20000036463 A | 7/2000 | |
| KR | 20010091677 A | 10/2001 | |
| KR | 20090028151 A | 3/2009 | |
| KR | 101632435 B1 | 6/2016 | |
| KR | 20170107683 A | 9/2017 | |
| KR | 20180059322 A | 6/2018 | |
| KR | 20190008137 A | 1/2019 | |
| KR | 20190085882 A | 7/2019 | |
| KR | 10-2170563 B1 | 10/2020 | |
| KR | 10-2173553 B1 | 11/2020 | |
| WO | 2018074516 A1 | 4/2018 | |
| WO | 2019139430 A1 | 7/2019 | |
| WO | 2019222591 A1 | 11/2019 | |

OTHER PUBLICATIONS

Extended European Search Report for Application No. 20189677.6, Dated Sep. 28, 2020, 9 Pgs.

Extended European Search Report for Application No. 22189981.8, mailed Jan. 17, 2023, 9 pages.

Extended European Search Report for Application No. 22207004.7 dated Mar. 9, 2023, 9 pgs.

Japanese Office Action for Application No. 2020-134046, Dated Sep. 10, 2021, 8 Pgs.

Korean Office Action for Application No. 10-2019-0097398, Dated Aug. 18, 2021, 15 Pgs.

Korean Office Action for Application No. 10-2019-0097398, Dated Jun. 25, 2020, 11 Pgs.

Adiwardana et al., "Towards a Human-like Open-Domain Chatbot", arXiv:2001.09977v3 [cs.CL], Feb. 27, 2020, 38 pgs.

Brown et al., "Language Models are Few-Shot Learners", arXiv:2005.14165v4 [cs.CL], Jul. 22, 2020, 75 pgs.

Cai et al., "Retrieval-guided Dialogue Response Generation via a Matching-to-Generation Framework", Proceedings of the 2019 Conference on Empirical Methods in Natural Language Processing and the 9th International Joint Conference on Natural Language Processing, Hong Kong, China, Nov. 3-7, 2019, pp. 1866-1875.

Cai et al., "Skeleton-to-Response: Dialogue Generation Guided by Retrieval Memory", arXiv:1809.05296v5 [cs.CL], Feb. 28, 2020, 8 pgs.

Choi et al., "Attentron: Few-Shot Text-to-Speech Utilizing Attention-Based Variable-Length Embedding", ArXiv abs/2005.08484, Aug. 12, 2020 (Version 2), 5 pages.

Choi et al., "Attentron: Few-Shot Text-to-Speech Utilizing Attention-Based Variable-Length Embedding", ArXiv abs/2005.08484, May 18, 2020 (Version 1), 5 pages.

Cooper et al., "Zero-Shot Multi-Speaker Text-to-Speech with State-of-the-Art Neural Speaker Embeddings", arXiv:1910.10838v2, Feb. 4, 2020, 5pgs.

Fan et al., "Augmenting Transformers with KNN-Based Composite Memory for Dialog", Transactions of the Association for Computational Linguistics, vol. 9, Mar. 1, 2021, pp. 82-99, https://doi.org/10.1162/tacl_a_00356.

Fu et al., "Stylistic Retrieval-based Dialogue System with Unparallel Training Data", arXiv:2109.05477, Sep. 12, 2021, 9 pages.

Gupta et al., "Controlling Dialogue Generation with Semantic Exemplars", Proceedings of the 2021 Conference of the North American Chapter of the Association for Computational Linguistics: Human Language Technologies, Jun. 6-11, 2021, pp. 3018-3029.

Guu et al., "REALM: Retrieval-Augmented Language Model Pre-Training", arXiv:2002.08909v1 [cs.CL], Feb. 10, 2020, 12 pgs.

Han et al., "Meet Your Favorite Character: Open-domain Chatbot Mimicking Fictional Characters with only a Few Utterances", arXiv:2204.10825, Apr. 22, 2022, 19 pages.

Holtzman et al., "The Curious Case of Neural Text Degeneration", arXiv:1904.09751v2 [cs.CL], Feb. 14, 2020, 16 pgs.

Hsu et al., "Hierarchical generative modeling for controllable speech synthesis", arXiv preprint arXiv:1810.07217v2, Dec. 27, 2018, 27 pgs.

Humeau et al., "Poly-Encoders: Architectures and Pre-Training Strategies for Fast and Accurate Multi-Sentence Scoring", International Conference on Learning Representations, Apr. 30, 2020, 14 pgs.

Kim et al., "Distilling the Knowledge of Large-scale Generative Models into Retrieval Models for Efficient Open-domain Conver-

(56)　　　　　References Cited

OTHER PUBLICATIONS sation", Findings of the Association for Computational Linguistics, EMNLP 2021, Nov. 7-11, 2021, pp. 3357-3373.

Kim et al., "Sequence-Level Knowledge Distillation", Proceedings of the 2016 Conference on Empirical Methods in Natural Language Processing, Austin, TX, Nov. 1-5, 2016, pp. 1317-1327.

Lee et al., "Robust and Fine-Grained Prosody Control of End-to-End Speech Synthesis", arXiv:1811.02122v2, Feb. 18, 2019, 5pgs.

Lewis et al., "Retrieval-Augmented Generation for Knowledge-Intensive NLP Tasks", arXiv:2005.11401v4 [cs.CL], Apr. 12, 2021, 19 pgs.

Li et al., "A Diversity-Promoting Objective Function for Neural Conversation Models", Proceedings of NAACL-HLT 2016, San Diego, California, Jun. 12-17, 2016, pp. 110-119.

Li et al., "Don't Say That! Making Inconsistent Dialogue Unlikely with Unlikelihood Training", arXiv:1911.03860v2 [cs.CL], May 6, 2020, 15 pgs.

Liu et al., "How Not to Evaluate Your Dialogue System: An Empirical Study of Unsupervised Evaluation Metrics for Dialogue Response Generation", Proceedings of the 2016 Conference on Empirical Methods in Natural Language Processing, Austin, Texas, Nov. 1-5, 2016, pp. 2122-2132.

Mazare et al., "Training Millions of Personalized Dialogue Agents", arXiv:1809.01984v1 [cs.CL], Sep. 6, 2018, 5 pgs.

Papineni et al., "BLEU: a Method for Automatic Evaluation of Machine Translation", Proceedings of the 40th Annual Meeting of the Association for Computational Linguistics (ACL), Philadelphia, Jul. 2002, pp. 311-318.

Roller et al., "Recipes for building an open-domain chatbot", arXiv:2004.13637v2 [cs.CL], Apr. 30, 2020, 25 pgs.

Serban et al., "Multiresolution Recurrent Neural Networks: An Application to Dialogue Response Generation", arXiv:1606.00776v2 [cs.CL], Jun. 14, 2016, 21 pgs.

Welleck et al., "Neural Text Degeneration with Unlikelihood Training", arXiv:1908.04319v2 [cs.LG], Sep. 26, 2019, 17 pgs.

Weston et al., "Retrieve and Refine: Improved Sequence Generation Models For Dialogue", arXiv:1808.04776v2 [cs.CL], Sep. 6, 2018, 6 pgs.

Wu et al., "Response Generation by Context-aware Prototype Editing", arXiv:1806.07042v4 [cs.CL], Nov. 16, 2018, 9 pgs.

Yang et al., "A Hybrid Retrieval-Generation Neural Conversation Model", arXiv:1904.09068v1 [cs.IR], Apr. 19, 2019, 11 pgs.

Zhang et al., "Dialogue Distillation: Open-Domain Dialogue Augmentation Using Unpaired Data", Proceedings of the 2020 Conference on Empirical Methods in Natural Language Processing, Nov. 16-20, 2020, pp. 3449-3460.

Zhang et al., "DIALOGPT: Large-Scale Generative Pre-training for Conversational Response Generation", Proceedings of the 58th Annual Meeting of the Association for Computational Linguistics, Jul. 5-10, 2020, pp. 270-278.

* cited by examiner

FIG. 1

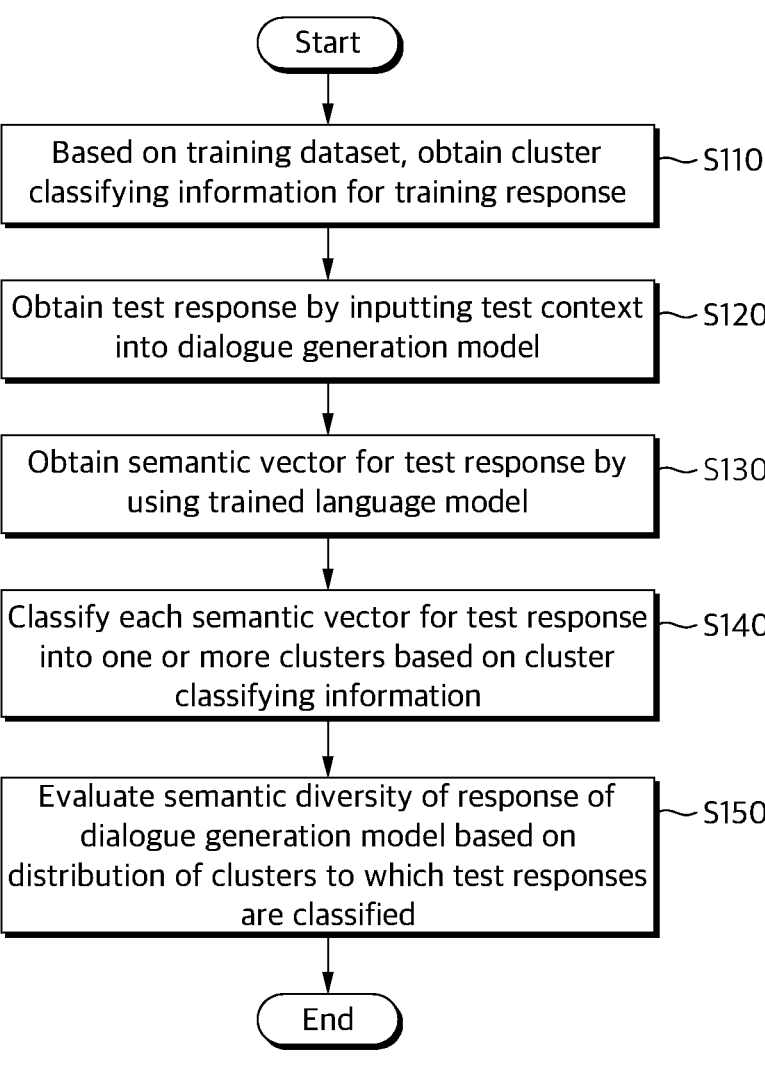

Start

Based on training dataset, obtain cluster classifying information for training response — S110

Obtain test response by inputting test context into dialogue generation model — S120

Obtain semantic vector for test response by using trained language model — S130

Classify each semantic vector for test response into one or more clusters based on cluster classifying information — S140

Evaluate semantic diversity of response of dialogue generation model based on distribution of clusters to which test responses are classified — S150

End

FIG. 3

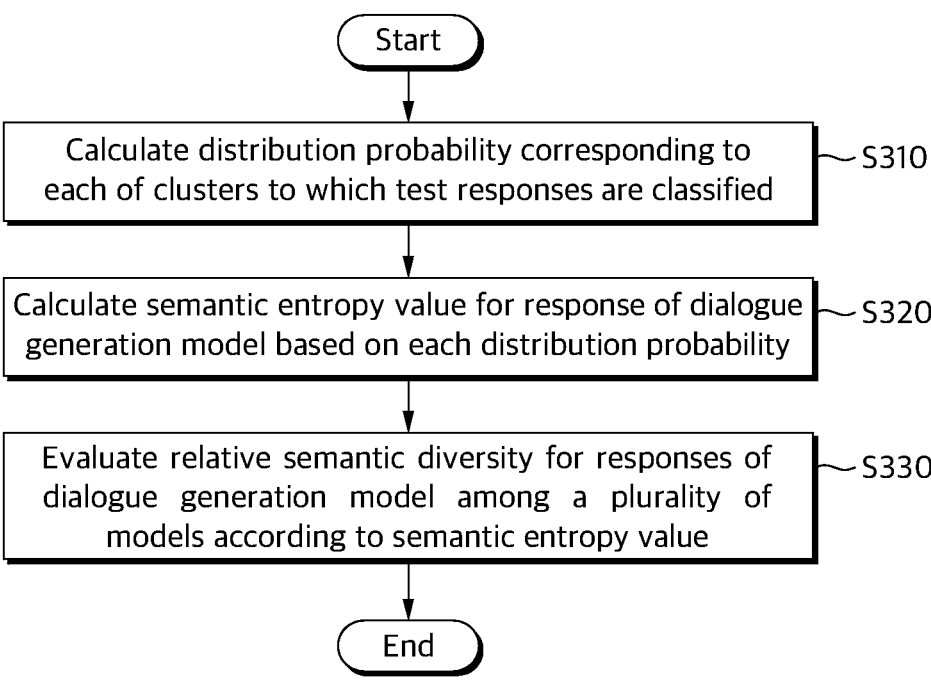

Start

Calculate distribution probability corresponding to each of clusters to which test responses are classified ⌇S310

Calculate semantic entropy value for response of dialogue generation model based on each distribution probability ⌇S320

Evaluate relative semantic diversity for responses of dialogue generation model among a plurality of models according to semantic entropy value ⌇S330

End

FIG. 9B

| Index | Responses |
|-------|-----------|
| 2 | · Yeah, I konw.<br>· Thank you.<br>· You are most welcome.<br>· No morem thank you very much.<br>· Not yet. |
| 13 | · that sounds great. Do you know if there are any vegetable dishes that are spicy?<br>· Do you want cheese on it?<br>· I agree. The colors must be soft and pleasant. You should feel comfortable when you cook our dinners. |
| 18 | · I bought a new mattress and some fresh bed-clothes. I also bought a new dressing table and a new bedside table.<br>· I'd Prefer non·smoking roommates, but I guess I'll have to take what I can get!<br>· A single room with a front view is 100 dollars per night, one with a rear is 80 dollars. |

FIG. 10

APPARATUS FOR EVALUATING AND IMPROVING RESPONSE, METHOD AND COMPUTER READABLE RECORDING MEDIUM THEREOF

CROSS-REFERENCE TO RELATED APPLICATION(S)

This application claims the benefit of Korean Patent Application No. 10-2022-0005922 filed on Jan. 14, 2022 and Korean Patent Application No. 10-2022-0084436 filed on Jul. 8, 2022, in the Korean Intellectual Property Office, the disclosure of which is incorporated herein by reference.

BACKGROUND

1. Field of the Invention

Example embodiments relate to an apparatus for evaluating and improving semantic diversity of responses in generated dialogues, a method and a computer readable recording medium thereof.

2. Description of the Related Art

Along with advances in large-scale trained language models over the past decades, so has the field of open domain dialogue generation. However, even though dialogue generation models generate fluent responses for a given context, these responses are dull and uninteresting in general (for example, "I don't know"). To solve this problem, attempts have been made to enhance the diversity of generated responses, and semantic diversity has become a major criterion for evaluating response quality.

Current model evaluation protocols for measuring response diversity uses a lexical-level evaluation methodology (for example, distinct-n, and entropy-n) but it is not clear whether the methodology fits well with human judgments of response variability. Responses may have very different meanings even if the responses are composed of similar words, and conversely, may have similar meanings even if the responses are composed of various words, and thus the lexical-level evaluation methodology cannot accurately identify semantic diversity. Nevertheless, since there is no clear methodology for measuring semantic diversity, most studies are based on lexical-level methodologies.

In addition, dialogue datasets for training the dialogue generation model have very biased semantic distribution on responses. The imbalance causes the model to generate responses that are not semantically diverse.

SUMMARY

An aspect provides an apparatus that evaluates the semantic diversity of responses when evaluating the diversity of the responses generated by the dialogue generation model, and a method thereof.

Another aspect also provides an apparatus that allows balanced training based on responses with various meanings by overcoming the imbalance of responses in a training dataset when training the dialogue generation model, and a method thereof.

The technical problems to be solved by the present disclosure are not limited the technical problems as described above, and another technical problem to be solved by the present disclosure may be inferred from the following example embodiments.

According to an aspect, there is provided a method for evaluating responses, including based on a training dataset comprising a plurality of training contexts and training responses corresponding to the plurality of training contexts respectively, obtaining cluster classifying information for the training responses, obtaining a plurality of test responses by inputting a plurality of test contexts into a dialogue generation model, obtaining semantic vectors for the test responses using a trained language model, classifying the semantic vectors for the test responses into one or more clusters respectively based on the cluster classifying information, and evaluating semantic diversity for the responses of the dialogue generation model based on distribution of the clusters to which the test responses are classified.

Each of the test responses may be an embedding vector corresponding to each utterance of the test context, and each of the semantic vectors for each of the test responses may be a vector in a latent vector space having each axis as a plurality of evaluation scales for semantic diversity.

The obtaining cluster classifying information may include obtaining the training dataset, obtaining the semantic vectors for the training responses using a trained language model, and classifying the semantic vectors for the training responses into one or more clusters respectively using a set classifying algorithm.

The classifying the semantic vectors for the training responses into one or more clusters respectively includes classifying the semantic vectors for the training responses into preset k number of clusters using a k-means clustering algorithm.

The classifying the semantic vectors for the test responses into one or more clusters respectively includes classifying the semantic vectors for the test responses into any one of the clusters to which the training responses are classified, using a mapping function that maps an input vector and the cluster classifying information.

The evaluating may include calculating a distribution probability corresponding to each of the clusters into which the test responses are classified, calculating semantic entropy values for the responses of the dialogue generation model based on each distribution probability, and evaluating relative semantic diversity for the responses of the dialogue generation model among a plurality of models according to the semantic entropy values.

The calculating the distribution probability may include calculating a distribution probability corresponding to one cluster by comparing a total number of responses output by the dialogue generation model with a number of responses belonging to the one cluster.

The calculating the semantic entropy values may include multiplying the each distribution probability by a log value for the each distribution probability, summing multiplied values for each of the clusters to which the test responses are classified, and outputting the semantic entropy values by adjusting a sign of summed values.

The evaluating the relative semantic diversity includes evaluating the relative semantic diversity for the responses of the dialogue generation model higher as a semantic entropy value increases, and evaluating the relative semantic diversity for the responses of the dialogue generation model lower as a semantic entropy value decreases.

According to another aspect, there is provided a method for improving responses includes, based on a training dataset comprising a plurality of training contexts and training responses corresponding to the plurality of training contexts respectively, obtaining cluster classifying information for the training responses, calculating a weight value for each of the clusters into which the training responses are classified based on the cluster classifying information, calculating a loss function value for the training dataset based on the calculated weight value, and training the dialogue generation model in a direction in which the loss function value decreases.

The calculating the weight value includes calculating a relatively low weight value for a cluster with a large number of classified training responses with reference to the cluster classifying information.

The calculating the weight value may include, with reference to the cluster classifying information, calculating a distribution probability corresponding to each of the clusters into which the training responses are classified respectively, and calculating a weight value for each of the training responses based on the distribution probability and a set weight intensity variable.

The calculating the loss function value may include multiplying the calculated weight value by each negative log-likelihood of the training dataset for a parameter set of the dialogue generation model, and calculating the loss function value by summing multiplied values for each of the training responses.

According to another aspect, there is provided an apparatus for evaluating responses, including an input/output interface, a memory for storing instructions, and a processor, wherein the processor, connected to the input/output interface and the memory, is configured to, based on a training dataset comprising a plurality of training contexts and training responses corresponding to the plurality of training contexts respectively, obtain cluster classifying information for the training responses, obtain a plurality of test responses by inputting a plurality of test contexts into a dialogue generation model, obtain semantic vectors for the test responses using a trained language model, classify the semantic vectors for the test responses into one or more clusters respectively based on the cluster classifying information, and evaluate semantic diversity for the responses of the dialogue generation model based on distribution of the clusters to which the test responses are classified.

The processor, in obtaining the cluster classifying information, may be configured to obtain the training dataset, obtain the semantic vectors for the training responses using the trained language model, and classify the semantic vectors for the training responses into one or more clusters respectively using a set classifying algorithm.

Further, the processor, in the classifying the semantic vectors for the test responses into one or more clusters respectively, may classify the semantic vectors for the test responses into any one of the clusters to which the training responses are classified, using a mapping function that maps an input vector and the cluster classifying information.

Further, the processor, in evaluating semantic diversity of responses from the dialogue generation model, may be configured to calculate a distribution probability corresponding to each of the clusters into which the test responses are classified, calculate semantic entropy values for the responses of the dialogue generation model based on each distribution probability, and evaluate relative semantic diversity for the responses of the dialogue generation model among a plurality of models according to the semantic entropy values.

Further, the processor, in calculating the semantic entropy values, may be configured to multiply the each distribution probability by a log value for the each distribution probability, sum multiplied values for each of the clusters to which the test responses are classified, and output the semantic entropy values by adjusting a sign of summed values.

According to another aspect, there is provided an apparatus for improving responses including an input/output interface, a memory for storing instructions and a processor, wherein the processor, connected to the input/output interface and the memory, is configured to, based on a training dataset comprising a plurality of training contexts and training responses corresponding to the plurality of training contexts respectively, obtain cluster classifying information for the training responses, calculate a weight value for each of the clusters into which the training responses are classified based on the cluster classifying information, calculate a loss function value for the training dataset based on the calculated weight value, and train the dialogue generation model in a direction in which the loss function value decreases.

The processor, in the calculating the weight value, may calculate a distribution probability corresponding to each of the clusters into which the training responses are classified respectively, and calculate a weight value for each of the training responses based on the distribution probability and a set weight intensity variable.

Further, the processor, in calculating the loss function value, may multiply the calculated weight value by each negative log-likelihood of the training dataset for a parameter set of the dialogue generation model, and calculate the loss function value by summing multiplied values for each of the training responses.

Further, there may be provided a computer readable recording medium including a computer program to execute a method for evaluating and improving responses according to the present disclosure.

Additional aspects of example embodiments will be set forth in part in the description which follows and, in part, will be apparent from the description, or may be learned by practice of the disclosure.

According to example embodiments, it is possible to evaluate diversity by considering the actual meanings of responses output by the model by evaluating the semantic diversity of the responses output by the dialogue generation model. The diversity evaluation result may be more consistent with human judgment in response diversity, when compared to the lexical-level evaluation methodology.

Further, according to the example embodiments, by training the dialogue generation model by applying weight values according to the distribution of responses in the training dataset, it is possible to overcome the imbalance of responses in the training dataset, and it is possible for the dialogue generation model to generate semantically more diverse responses. The training method is significantly superior in semantic diversity compared to existing methodologies, and interestingly, it also shows excellent performance in lexical-level diversity. Further, according to human judgment, the training method is more effective than the existing methods in terms of appropriateness and informativeness of responses.

Additional features and advantages of the disclosure will be set forth in the description which follows, and in part will be apparent from the description, or may be learned by practice of the disclosure. The objectives and other advantages of the disclosure will be realized and attained by the structure particularly pointed out in the written description and claims hereof as well as the appended drawings.

BRIEF DESCRIPTION OF THE DRAWINGS

These and/or other aspects, features, and advantages of the disclosure will become apparent and more readily appreciated from the following description of example embodiments, taken in conjunction with the accompanying drawings of which:

FIG. 1 is a flowchart describing a method for evaluating responses according to an example embodiment;

FIG. 3 is a flowchart for describing operation S150 in more detail according to an example embodiment;

FIG. 9*b* is an exemplary diagram illustrating training responses belonging to each classified cluster; and FIG. 10 is a block diagram illustrating an apparatus for evaluating and improving responses according to an example embodiment.

DETAILED DESCRIPTION

Figure 2:
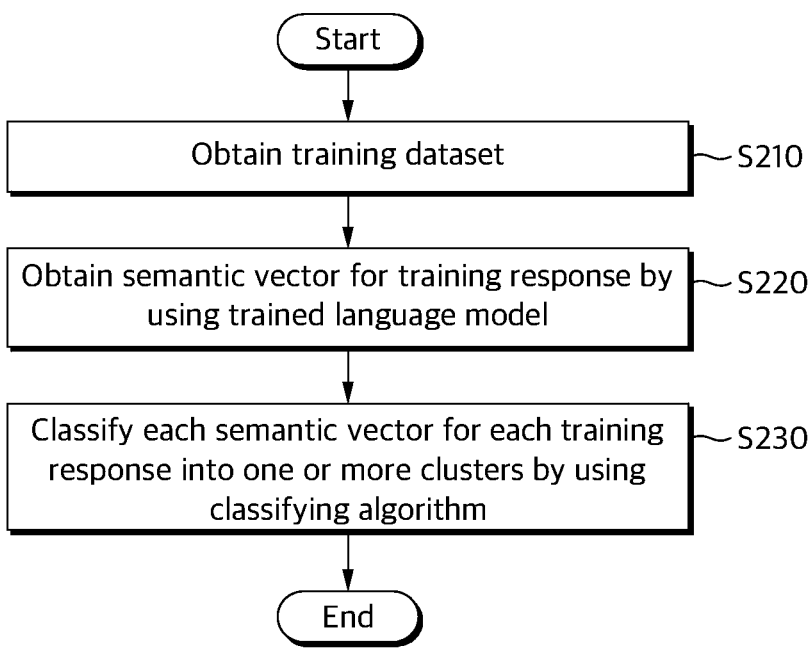
FIG. 2 is a flowchart for describing operation S110 in more detail according to an example embodiment.

Hereinafter, specific example embodiments are described with reference to the drawings. The following detailed description is provided for comprehensive understanding of the methods, apparatus, and/or systems described herein. However, the example embodiments are only for understanding and the present disclosure is not limited to the detailed description.

In describing the embodiments, when it is determined that a detailed description of the related known technology may unnecessarily obscure the gist of the disclosed embodiments, the detailed description will be omitted. In addition, the terms to be described later are terms defined in consideration of functions in the example embodiments of the present disclosure, which may vary according to intentions or customs of users and operators. Therefore, the definitions should be made based on the content throughout the present disclosure. The terms used in the detailed description are for the purpose of describing the embodiments only, and the terms should never be restrictive. Unless explicitly used otherwise, expressions in the singular include the meaning of the plural. In the present disclosure, expressions such as "include" or "comprise" are intended to refer to certain features, numbers, steps, acts, elements, some or a combination thereof, and the expressions should not be construed to exclude the presence or possibility of one or more other features, numbers, steps, acts, elements, or some or combinations thereof other than those described.

Terms used in the example embodiments are selected as currently widely used general terms as possible while considering the functions in the present disclosure. However, the terms may vary depending on the intention or precedent of a person skilled in the art, the emergence of new technology, and the like. Further, in certain cases, there are also terms arbitrarily selected by the applicant, and in the cases, the meaning will be described in detail in the corresponding descriptions. Therefore, the terms used in the present disclosure should be defined based on the meaning of the terms and the contents of the present disclosure, rather than the simple names of the terms.

Throughout the specification, when a part is described as "comprising or including" a component, it does not exclude another component but may further include another component unless otherwise stated. Furthermore, terms such as " . . . unit," " . . . group," and " . . . module" described in the specification mean a unit that processes at least one function or operation, which may be implemented as hardware, software, or a combination thereof. Unlike used in the illustrated embodiments, the terms may not be clearly distinguished in specific operations.

Expression "at least one of a, b and c" described throughout the specification may include "a alone," "b alone," "c alone," "a and b," "a and c," "b and c" or "all of a, b and c."

In the present disclosure, a "terminal" may be implemented as, for example, a computer or a portable terminal capable of accessing a server or another terminal through a network. Here, the computer may include, for example, a notebook, a desktop computer, and/or a laptop computer which are equipped with a web browser. The portable terminal may be a wireless communication device ensuring portability and mobility, and include (but is not limited to) any type of handheld wireless communication device, for example, a tablet PC, a smartphone, a communication-based terminal such as international mobile telecommunication (IMT), code division multiple access (CDMA), W-code division multiple access (W-CDMA), long term evolution (LTE), or the like.

In the following description, terms "transmission," "communication," "sending," "receiving" and other similar terms not only refer to direct transmission of a signal or information from one component to another component, but also include transmission via another component.

In particular, to "transmit" or "send" a signal or information to an element may indicate a final destination of the signal or information, and may not imply a direction destination. The same is applied to in "receiving" a signal or information. In addition, in the present disclosure, when two or more pieces of data or information are "related," it indicates that when one piece of data (or information) is obtained, at least a part of the other data (or information) may be obtained based thereon.

Further, terms such as first and second may be used to describe various components, but the above components should be not limited by the above terms. The above terms may be used for the purpose of distinguishing one component from another component.

For example, without departing from the scope of the present disclosure, a first component may be referred to as a second component. Similarly, the second component may also be referred to as the first component.

In describing the example embodiments, descriptions of technical contents that are well known in the technical field to which the present disclosure pertains and that are not directly related to the present disclosure will be omitted. This is to more clearly convey the gist of the present disclosure without obscuring the gist of the present disclosure by omitting unnecessary description.

For the same reason, some elements are exaggerated, omitted or schematically illustrated in the accompanying drawings. In addition, the size of each element does not fully reflect the actual size. In each figure, the same or corresponding elements are assigned the same reference numerals.

Advantages and features of the present disclosure, and a method of achieving the advantages and the features will become apparent with reference to the example embodiments described below in detail together with the accompanying drawings. However, the present disclosure is not limited to the example embodiments disclosed below, and may be implemented in various different forms. The example embodiments are provided only so that the present disclosure to be complete, and completely inform the scope of the present disclosure to those of ordinary skill in the art to which the present disclosure pertains. The present disclosure is only defined by the scope of the claims. Like reference numerals refer to like elements throughout.

It will be understood that each block of a flowchart diagram and a combination of the flowchart diagrams may be performed by computer program instructions. The computer program instructions may be embodied in a processor of a general-purpose computer or a special purpose computer, or may be embodied in a processor of other programmable data processing equipment. Thus, the instructions, executed via a processor of a computer or other programmable data processing equipment, may generate a part for performing functions described in the flowchart blocks. To implement a function in a particular manner, the computer program instructions may also be stored in a computer-usable or computer-readable memory that may direct a computer or other programmable data processing equipment. Thus, the instructions stored in the computer usable or computer readable memory may be produced as an article of manufacture containing an instruction part for performing the functions described in the flowchart blocks. The computer program instructions may be embodied in a computer or other programmable data processing equipment. Thus, a series of operations may be performed in a computer or other programmable data processing equipment to create a computer-executed process, and the computer or other programmable data processing equipment may provide steps for performing the functions described in the flowchart blocks.

Additionally, each block may represent a module, a segment, or a portion of code that includes one or more executable instructions for executing a specified logical function(s). It should also be noted that in some alternative implementations the functions recited in the blocks may occur out of order. For example, two blocks shown one after another may be performed substantially at the same time, or the blocks may sometimes be performed in the reverse order according to a corresponding function.

Hereinafter, example embodiments of the present disclosure will be described in detail with reference to the accompanying drawings so that those of ordinary skill in the art to which the present disclosure pertains may easily implement them. However, the present disclosure may be implemented in multiple different forms and is not limited to the example embodiments described herein.

Methods illustrated in FIGS. 1 to 7, for example, may be performed by an electronic apparatus 100 described with reference to FIG. 10. In other words, in the present disclosure, as an exemplary apparatus for evaluating and improving responses, the electronic apparatus 100 may be a single apparatus, but according to an example embodiment, the electronic apparatus 100 may be a system composed of a plurality of detailed apparatuses that communicate with each other through wired or wireless network.

Figure 8:
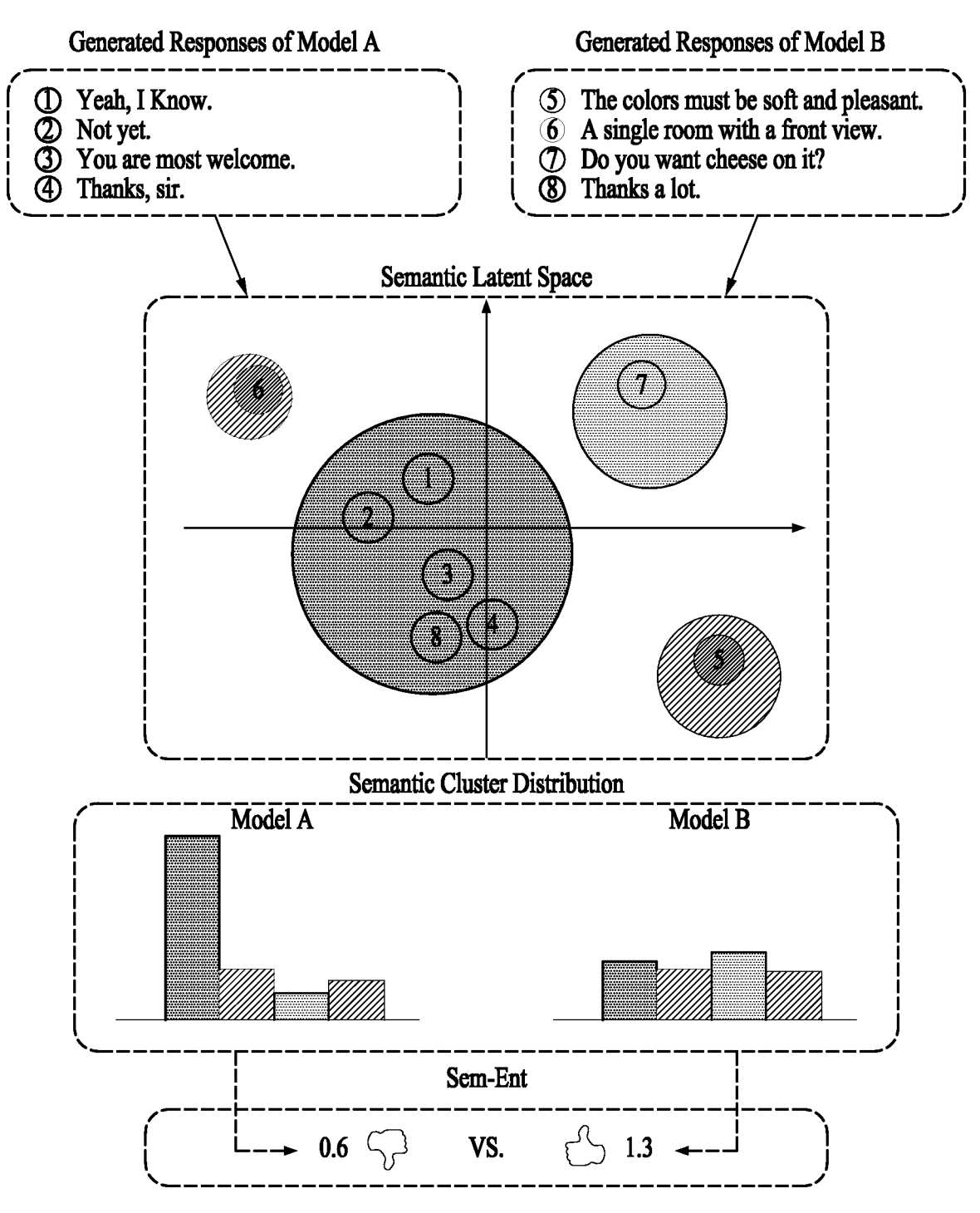
FIG. 8 is a conceptual diagram for evaluating semantic diversity of responses output by a dialogue generation model.

Hereinafter, referring to FIGS. 1 to 4, described is a method for evaluating the semantic diversity of responses output by the dialogue generation model. A conceptual diagram for the method is illustrated in FIG. 8. In the present disclosure, evaluation of responses indicates evaluation of semantic diversity of responses to a given context, and more specifically, refers to the evaluation of how semantically various responses output by the dialogue generation model are.

FIG. 1 is a flowchart describing a method for evaluating responses according to an example embodiment.

In operation S110, based on a training dataset including a plurality of training contexts and training responses corresponding to the plurality of training contexts respectively, the electronic apparatus 100 obtains cluster classifying information for the training responses.

In operation S120, the electronic apparatus 100 obtains a plurality of test responses by inputting a plurality of test contexts into a dialogue generation model. In the present disclosure, "context" is sequence information of words or sentences to be referred to for outputting a response, and may be a vector of a fixed size indicating a sequence of words or sentences according to an example embodiment. According to an example embodiment, the "context" may include information (for example, an attention weight value) on how much weight was given to which part of a vector value for a preceding utterance in determining a vector value for a subsequent utterance in the course of the conversation. For example, the "context" may be constructed by concatenating information on background knowledge to be referenced when outputting a response and sequence information of words or sentences.

According to an example embodiment, the dialogue generation model may be a bidirectional language model, a unidirectional language model, or a transformer-based model. For example, the dialogue generation model may be a bidirectional encoder representations from transformer (BERT)-based model or a generative pre-training (GPT)-based model (for example, DialoGPT).

In operation S130, the electronic apparatus 100 obtains a semantic vector for a test response by using a trained language model.

In example embodiments, a test response output by the dialogue generation model may be an embedding vector corresponding to each utterance for each test context, and a semantic vector for a test response may be a vector in a latent vector space having each axis as a plurality of evaluation scales for semantic diversity. More specifically, the evaluation scale for "semantic diversity" may include a grammatical type of a response (for example, an interrogative sentence, a declarative sentence, a positive sentence and a negative sentence), the detailed meaning of the response (for example, expression of gratitude, a specific place or time, stating facts and presumption) and the diversity of vocabulary constituting the response. However, it should be noted that "the semantic diversity" does not measure only "diversity of vocabulary constituting a response" as an evaluation criterion. Therefrom, the present disclosure is differentiated from existing methods for evaluating semantic diversity at the lexical-level.

According to an example embodiment, the "language model" used for semantic vector transformation may be a bidirectional language model, a unidirectional language model and a transformer-based model. For example, the language model may be the BERT-based model and the GPT-based model (for example, DialoGPT).

In example embodiments, the "language model" used for semantic vector transformation may be the dialogue generation model itself, or it may be a neural network model separate from the dialogue generation model. If the dialogue generation model is the "language model," the dialogue generation model outputs a response and converts the response directly into a semantic vector.

In operation S140, the electronic apparatus 100 classifies each semantic vector for a test response into one or more clusters based on the previously obtained cluster classifying information.

According to an example embodiment, using a mapping function that maps input vectors and the cluster classifying information, the electronic apparatus 100 may classify each semantic vector for a test response into any one of clusters into which training responses are classified. In other words, assuming that a semantic vector for the training response and a semantic vector for the test response have the same dimension, the mapping function may receive the semantic vector for the test response as an input, and output which cluster the semantic vector corresponds to among clusters into which the training responses are classified.

In operation S150, the electronic apparatus 100 evaluates the semantic diversity of responses of the dialogue generation model based on the distribution of clusters to which the test responses are classified.

Hereinafter, the example embodiments are described in more details with reference to FIGS. 2 to 4.

FIG. 2 is a flowchart for describing operation S110 in more detail according to an example embodiment.

In operation S210, the electronic apparatus 100 obtains the training dataset including a plurality of training contexts and training responses corresponding to the plurality of training contexts respectively.

In operation S220, the electronic apparatus 100 obtains a semantic vector for a training response by using the trained language model.

In operation S230, the electronic apparatus 100 classifies each semantic vector for each of the training responses into one or more clusters using a set classifying algorithm.

According to an example embodiment, as a classifying algorithm used for cluster classification, the electronic apparatus 100 may classify a semantic vector for a training response into preset k number of clusters by using the k-means clustering algorithm. Specifically, the electronic apparatus 100 May 1) select the k number of clusters to be classified, 2) initially set a center point of each cluster, 3) calculate the distance between each semantic vector and the center point of each cluster, and classify a semantic vector so that the semantic vector belongs to a cluster having the closest distance, 4) take the average of each semantic vector in a classified cluster and recalculate the center point of the cluster, and 5) perform cluster classification by repeating 3) and 4) by the set number of repetitions or until the amount of change in the center point of the cluster is less than or equal to a predetermined number.

According to another example embodiment, the electronic apparatus 100 may use k-median clustering algorithm as a classifying algorithm used for cluster classification.

According to another example embodiment, as a classifying algorithm used for cluster classification, the electronic apparatus 100 may use any one of a mean-shift classifying algorithm, a density-based spatial clustering of applications with noise (DBSCAN) algorithm, an expectation-maximization (EM) classifying algorithm using Gaussian mixture models (GMMs) and an agglomerative hierarchical classifying algorithm.

However, such classifying algorithms are exemplary embodiments, and according to an example embodiment, the electronic apparatus 100 may perform cluster classification by mixing two or more classifying algorithms.

FIG. 3 is a flowchart for describing operation S150 in more detail according to an example embodiment.

In operation S310, the electronic apparatus 100 calculates a distribution probability corresponding to each of clusters to which test responses are classified.

According to an example embodiment, the electronic apparatus 100 may calculate a distribution probability corresponding to a cluster by comparing the number of responses belonging to the one cluster to the total number of responses output by the dialogue generation model. More specifically, the electronic apparatus 100 may calculate distribution of the probability that a semantic vector corresponding to a response output by the dialogue generation model belongs to each cluster. For example, the electronic apparatus 100 may calculate a distribution probability corresponding to each cluster based on Equation 1 below.

$$\tilde{p}(j) = \frac{1}{n}\sum_{i=1}^{n}\mathbb{1}\left(\phi_C\left(e\left(r_i^M\right)\right) = j\right) \qquad \text{[Equation 1]}$$

Here, $r^M$ indicates responses that dialogue generation model M outputs, n indicates the number of responses, $e(r^M)$ indicates semantic vectors corresponding to $r^M$, $\phi_C(x)$ indicates a mapping function that returns a sequence number value of the cluster to which x belongs, and $\tilde{p}(j)$ indicates a distribution probability corresponding to the j-th cluster. In other words, $\tilde{p}(j)$ may indicate a probability indicating how many responses belong to the j-th cluster.

In operation S320, the electronic apparatus 100 calculates a semantic entropy value for the responses of the dialogue generation model based on each calculated distribution probability. With regard to this, it is described below in detail with reference to FIG. 3.

In operation S330, the electronic apparatus 100 evaluates the relative semantic diversity for responses of the dialogue generation model among a plurality of models according to the calculated semantic entropy value.

According to an example embodiment, as the semantic entropy value increases, the electronic apparatus 100 may provide a more favorable evaluation of the relative semantic diversity for responses of the dialogue generation model, and as the semantic entropy value decreases, the electronic apparatus 100 may provide a less favorable evaluation of the relative semantic diversity for responses of the dialogue generation model.

Figure 4:
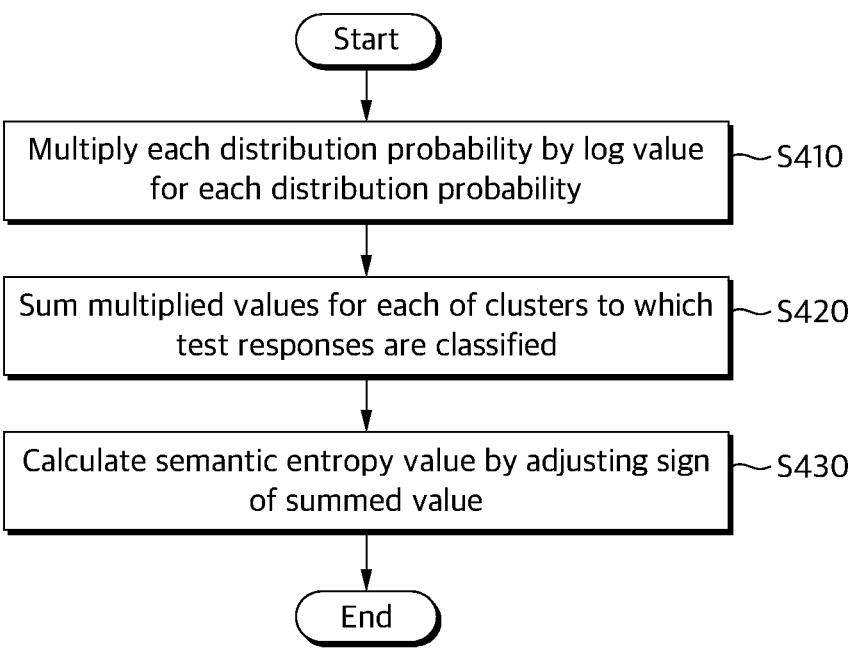
FIG. 4 is a flowchart for describing operation S320 in more detail according to an example embodiment.

FIG. 4 is a flowchart for describing operation S320 in more detail according to an example embodiment.

In operation S410, the electronic apparatus 100 multiplies each distribution probability calculated in operation S310 by a log value for each distribution probability. With regard to this, the log taken for the distribution probability may be a natural log, and the base value may be the exponential constant e, but this may be variously set according to an example embodiment, and in addition to e, natural number 2 or higher value may be set as the base value.

In operation S420, the electronic apparatus 100 sums the multiplied values for each of clusters to which test responses are classified.

In operation S430, the electronic apparatus 100 calculates a semantic entropy value by adjusting the sign of the summed value. For example, the electronic apparatus 100 may maintain the sign of the summed value when the value calculated through operation S420 is 0 or a positive number, and when the summed value is a negative number, the electronic apparatus 100 may adjust the summed value to be a positive number.

According to an example embodiment, the electronic apparatus 100 may calculate a semantic entropy value for a response output by the dialogue generation model based on Equation 2 below.

$$Sem-Ent\left(\mathcal{R}^{M}\right) = -\sum_{j=1}^{k} \tilde{p}(j)\cdot\log\tilde{p}(j)$$ [Equation 2]

Here, $\tilde{p}(j)$ indicates the distribution probability corresponding to the j-th cluster, k indicates the number of clusters, $R^{M}$ indicates a set of responses output by model M, and Sem-Ent indicates a semantic entropy value.

Figure 9A:
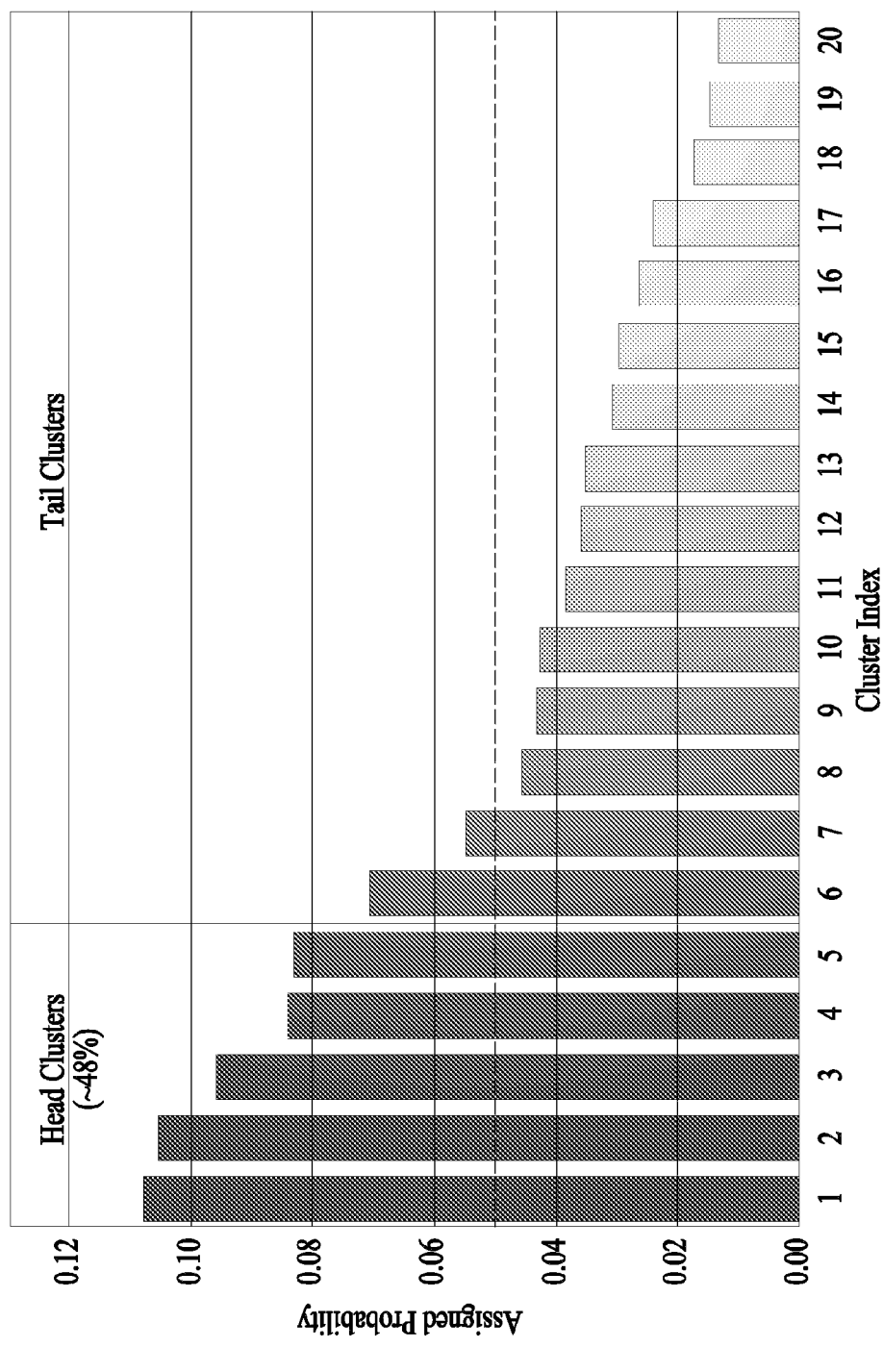
FIG. 9*a* is an exemplary graph illustrating distribution of clusters into which the training responses are classified respectively.

Hereinafter, in connection with the method for evaluating the semantic diversity of responses described above, a method for training the dialogue generation model is described with reference to FIGS. 5 to 7. The method is for training the dialogue generation model by applying weight values according to the distribution of responses in the training dataset. With regard to this, FIGS. 9a and 9b are exemplary graphs and exemplary data related thereto.

Figure 5:
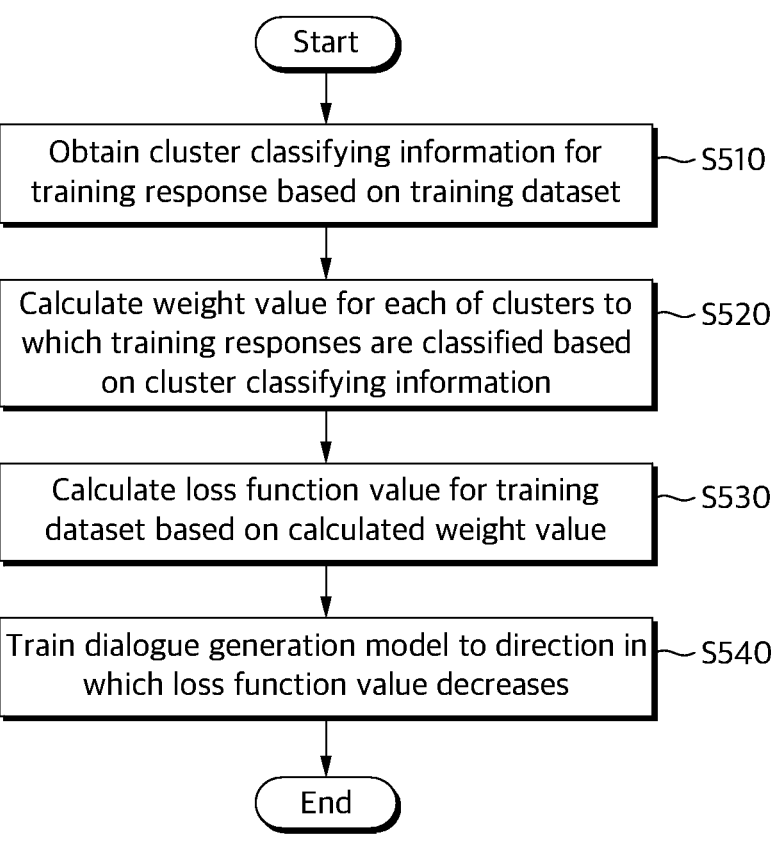
FIG. 5 is a flowchart describing a method for improving responses according to an example embodiment.

FIG. 5 is a flowchart describing a method for improving responses according to an example embodiment.

In operation S510, based on the training dataset including a plurality of training contexts and a training response corresponding to each of the plurality of training contexts, the electronic apparatus 100 obtains cluster classifying information for the training response. More specifically, the training dataset may be a dataset including a query (context) and a response thereto, for supervised model training.

According to an example embodiment, the electronic apparatus 100 may obtain only cluster classifying information from an external local apparatus or database, without separately obtaining a training dataset.

According to another example embodiment, after obtaining the training dataset, the electronic apparatus 100 may calculate cluster classifying information by classifying each of the direct training responses into one or more clusters based on the obtained training dataset.

In operation S520, the electronic apparatus 100 calculates a weight value for each of the clusters to which the training responses are classified based on the cluster classifying information. With regard to this, it is described in detail with reference to FIG. 6 below.

According to an example embodiment, with reference to the cluster classifying information, the electronic apparatus 100 may calculate a relatively low weight value as the number of classified trained responses is greater in a cluster. Accordingly, in operation S540 of training the dialogue generation model to be described later, the electronic apparatus 100 may give a penalty to a cluster having a large number of training responses compared to a case in which a weight value is not considered so that the cluster has little effect on training, and the electronic apparatus 100 may induce training to be performed focusing on a cluster to which training responses were classified infrequently.

In operation S530, the electronic apparatus 100 calculates a loss function value for the training dataset based on the calculated weight value. In this regard, it is described in detail below with reference to FIG. 7.

In operation S540, the electronic apparatus 100 trains the dialogue generation model to the direction in which the loss function value decreases. More specifically, the electronic apparatus 100 may train the dialogue generation model so that the loss function value is minimized. In some embodiments, the electronic apparatus 100 may train the dialogue generation model in the direction in which the loss function value decreases within the limits such as a set number of training epochs and a batch number of data used for training of each epoch.

Figure 6:
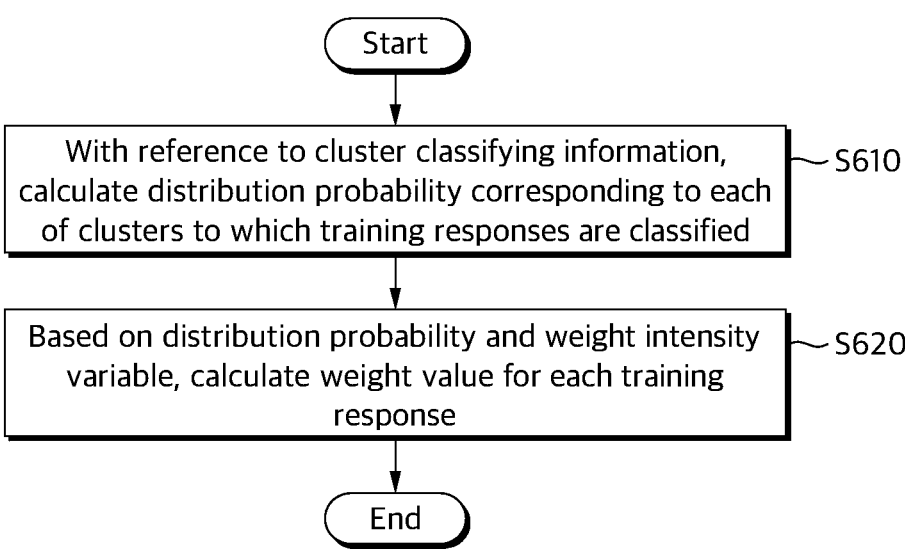
FIG. 6 is a flowchart for describing operation S520 in more detail according to an example embodiment.

FIG. 6 is a flowchart for describing operation S520 in more detail according to an example embodiment.

In operation S610, with reference to the cluster classifying information, the electronic apparatus 100 calculates the distribution probability corresponding to each of clusters to which the training responses are classified.

In operation S620, based on the distribution probability and a set weight intensity variable, the electronic apparatus 100 calculates a weight value for each training response. In the present disclosure, the "weight intensity variable" is a variable that determines the strength that reflects the weight in the electronic apparatus 100 calculating the loss function value for the training dataset, and the weight intensity variable may be a hyper-parameter that is set separately by a manager of the electronic apparatus 100 in advance, or may be a variable automatically set by the electronic apparatus 100.

According to an example embodiment, the electronic apparatus 100 may calculate a weight value for each training response based on Equation 3 below.

$$w(r)=(1-\tilde{p}(\phi_{C}(e(r))))^{\gamma}$$ [Equation 3]

Here, r indicates a training response, e(r) indicates a semantic vector corresponding to training response r, $\phi_{C}(x)$ indicates a mapping function that returns a sequence number value of the cluster to which x belongs, $\tilde{p}(j)$ indicates the distribution probability corresponding to the j-th cluster, $\gamma$ indicates a weight intensity variable, and w(r) indicates a weight value corresponding to response r. According to above Equation 3, the electronic apparatus 100 may identify which cluster e(r) belongs to for all or a part of r with reference to the cluster classifying information and accordingly, the electronic apparatus 100 may calculate $\tilde{p}(j)$ in operation S610.

According to an example embodiment, the electronic apparatus 100 may additionally apply negative training in order to give a stronger penalty to a cluster having a large number of training responses. More specifically, when the model generates a response for a given training context for each epoch of training and if the response belongs to a cluster having the distribution probability that is higher than a preset criterion (for example, a cluster having the distribution probability of responses is 0.1 or higher), the electronic apparatus 100 may set a weight value of a corresponding response to $-1$ by assuming that the corresponding response is a negative example.

Figure 7:
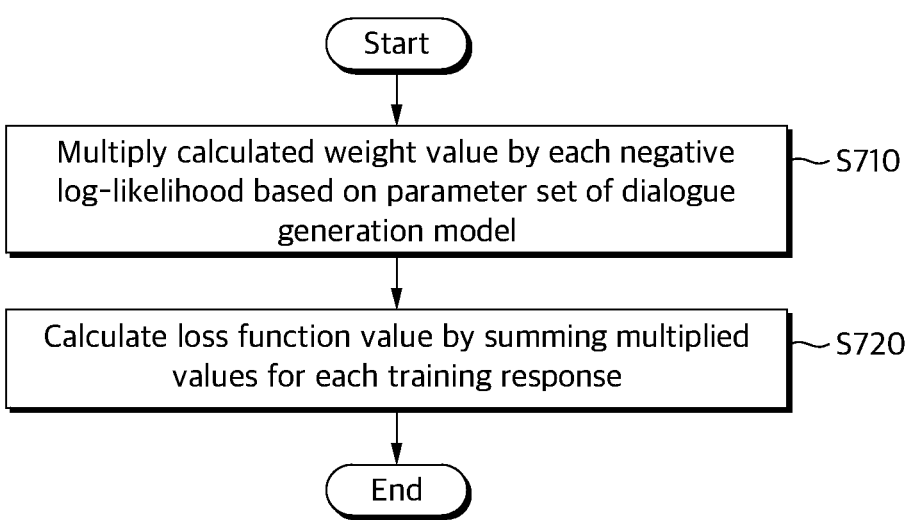
FIG. 7 is a flowchart for describing operation S530 in more detail according to an example embodiment.

FIG. 7 is a flowchart for describing operation S530 in more detail according to an example embodiment.

In operation S710, the electronic apparatus 100 multiplies a calculated weight value by each negative log-likelihood of the training dataset for the parameter set of the dialogue generation model. In the present disclosure, "$\theta$" indicates the parameter of the statistical model that generated the corresponding training dataset (the dialogue generation model), and may be expressed as a vector when there are two or more types of parameters.

According to an example embodiment, the electronic apparatus 100 may calculate the negative log-likelihood of the training dataset based on Equation 4 below.

$$L_{NLL}(D) = -\sum_{i=1}^{m} \log p_\theta(r_i|c_i) \qquad \text{[Equation 4]}$$

Here, D indicates the training dataset, $L_{NLL}$(D) indicates the negative log-likelihood for training dataset D, m indicates the number of the training contexts or training responses, c indicates the training context, r indicates the training response, and θ indicates the parameter set of the dialogue generation model to be trained.

In operation S720, the electronic apparatus 100 calculates a loss function value for the training dataset by summing multiplied values for each training response.

According to an example embodiment, the electronic apparatus 100 may calculate a loss function value for the training dataset based on Equation 5 below.

$$L_{DRESS}(D) = -\sum_{i=1}^{m} w(r_i) \cdot \log p_\theta(r_i|c_i) \qquad \text{[Equation 5]}$$

Here, w(r) indicates a weight value for training response r, and $L_{DRESS}$ (D) indicates a loss function value for training dataset D. Accordingly, the electronic apparatus 100 may train the dialogue generation model by applying the weight for each response in the negative log-likelihood that each response may be output, so that the electronic apparatus 100 may prevent the dialogue generation model from being trained by focusing on the training data of a specific cluster, and improve the semantic diversity of responses output by the dialogue generation model.

In the above flowchart, the method is described by being divided into the plurality of operations. However, at least some operations may be performed in a reversed order, may be performed in combination with other operations, may be omitted, may be performed by being divided into more detailed operations, and/or may be performed by adding one or more operations not illustrated.

FIG. 8 is a conceptual diagram for evaluating semantic diversity of responses output by a dialogue generation model. Specifically, FIG. 8 provides conceptually illustrated images to help understanding of the method for evaluating semantic diversity of responses described with reference to FIGS. 1 to 4.

Specifically, the coordinate space of FIG. 8 is a semantic latent space, which is a measure for evaluating semantic diversity of responses output by the dialogue generation models according to the method of FIGS. 1 to 4. The responses output by two dialogue generation models A and B are distributed in the coordinate space. Below that, the semantic distribution of the responses output by models A and B is illustrated in graphs. Based on this, the relative semantic diversity for responses of the two models is evaluated based on the semantic entropy values (Sem-Ent). It is assumed that the context information input to both of the models is the same.

Referring to FIG. 8, as responses for the context, Model A outputs 1) "Yeah, I Know," 2) "Not yet," 3) "You are most welcome," and 4) "Thanks, sir" and Model B outputs 5) "The colors must be soft and pleasant," 6) "A single room with a font view," 7) "Do you want cheese on it?" and 8) "Thanks a lot."

According to the classifying algorithm, semantic vectors for each of responses 1) to 8) in the latent vector space are classified into clusters, and as a result, responses 1), 2), 3), 4) and 8) are classified into one cluster, and remaining responses 5), 6) and 7) are classified into respectively different clusters.

The graphs displayed below the coordinate space in which the clusters are displayed show the distribution of which of the four clusters the plurality of responses including 1) to 8) belong respectively. In Model A, most responses are biased in the first cluster, whereas in Model B, responses belong to the four clusters relatively evenly.

Based on this, if the semantic entropy value of Model A calculated is 0.6 and the semantic entropy value of Model B is 1.3, the electronic apparatus 100 may evaluate the semantic diversity of the responses output by Model B higher than the semantic diversity of the responses output by Model A. However, the evaluation of semantic diversity based on the responses, the cluster classification, the graph shape and the semantic entropy values shown in FIG. 8 are exemplary.

FIGS. 9a and 9b are exemplary diagrams to help understanding the training method of the dialogue generation model described with reference to FIGS. 5 to 7. Specifically, FIG. 9a is an exemplary graph illustrating distribution of clusters into which the training responses are classified respectively, and FIG. 9b is an exemplary diagram illustrating training responses belonging to each classified cluster.

First, FIG. 9a illustrates that the training responses used for training the dialogue generation model are not evenly distributed in each cluster but are biased in some clusters. With regard to the distribution of responses illustrated in FIG. 9a, the proportion of responses belonging to the top 5 clusters (the head clusters) out of a total of 20 clusters is about 48%. This is comparable to the proportion of responses belonging to the remaining 15 clusters (the tail clusters). Thus, if the model is trained without no weight application on the biased training responses, the model will output responses belonging to some clusters (the head clusters) with high probability, and this may adversely affect the semantic diversity of responses.

For example, as illustrated in FIG. 9b, when the responses belonging to Cluster 2 have uniform and formal vocabularies compared to the responses belonging to Cluster 13 and Cluster 18, if the model is trained using training responses without weight application, the model may mainly output simple responses such as "Thank you" and "You are most welcome" in response to a new context.

With regard to this, the electronic apparatus 100 may give a relatively high weight value to the log-likelihood that a response belonging to a cluster having a relatively low distribution probability is output, and therefrom in the process of training the model in the direction of reducing the loss function value, the electronic apparatus 100 may control the training process in order for responses belonging to a cluster with a relatively low distribution probability to be considered with great importance.

Figure 10:
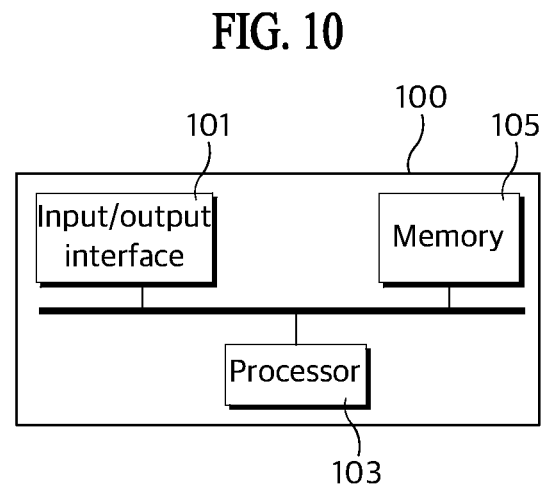

FIG. 10 is a block diagram illustrating an apparatus for evaluating and improving responses according to an example embodiment.

The electronic apparatus 100 may include an input/output interface 101, a memory 103 and a processor 105, according to an example embodiment. According to an example embodiment, the electronic apparatus 100 may exchange data with the outside through the input/output interface 101.

The processor 105 may perform at least one method described above with reference to FIGS. 1 to 9. The memory 103 may store information for performing at least one method described above with reference to FIGS. 1 to 9. The memory 103 may be a volatile memory or a non-volatile memory.

The processor 105 may control the electronic apparatus 100 to execute a program and provide information. Codes of the program executed by the processor 105 may be stored in the memory 103.

According to an example embodiment, being connected to the input/output interface 101 and the memory 103, the processor 105 may obtain cluster classifying information for training responses based on the training dataset, which includes a plurality of training contexts and training responses corresponding to the plurality of training contexts respectively, obtain a plurality of test responses by inputting a plurality of test contexts into the dialogue generation model, obtain a semantic vector for each of the test responses using the trained language model, classify each semantic vector for each of the test responses into one or more clusters based on the cluster classifying information, and evaluate semantic diversity of the responses of the dialogue generation model based on distribution of the clusters to which the test responses are classified.

According to another example embodiment, being connected to the input/output interface 101 and the memory 103, the processor 105 may obtain cluster classifying information for the training responses based on the training dataset, which includes a plurality of training contexts and training responses corresponding to the plurality of training contexts respectively, calculate a weight value for each of the clusters into which the training responses are classified based on the cluster classifying information, calculate the loss function value for the training dataset based on the calculated weight value, and train the dialogue generation model in the direction in which the loss function value decreases.

According to another example embodiment, the electronic apparatus 100 may further include an interface that provides information to a user of the electronic apparatus 100. For example, the electronic apparatus 100 may provide (or output) the relative semantic diversity for responses of the dialogue generation model evaluated among a plurality of models through the input/output interface 101 or another interface of the electronic device 100.

In FIG. 10, only the components related to the electronic apparatus 100 of the present exemplary embodiment are illustrated. Therefore, those of ordinary skill in the art related to the present example embodiments will understand that other general-purpose components may be further included in addition to the components illustrated in FIG. 10.

The electronic device according to the above-described example embodiments may include a processor, a memory for storing and executing program data, a permanent storage such as a disk drive, and a user interface device such as a communication port, a touch panel, a key and a button that communicates with an external device. Methods implemented as software modules or algorithms may be stored in a computer-readable recording medium as computer-readable codes or program instructions executable on the processor. Here, the computer-readable recording medium includes a magnetic storage medium (for example, ROMs, RAMs, floppy disks and hard disks) and an optically readable medium (for example, CD-ROMs and DVDs). The computer-readable recording medium may be distributed among network-connected computer systems, so that the computer-readable codes may be stored and executed in a distributed manner. The medium may be readable by a computer, stored in a memory, and executed on a processor.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and look-up table, that may execute various functions by the control of one or more microprocessors or other control devices. Similar to that elements may be implemented as software programming or software elements, the example embodiments may be implemented in a programming or scripting language such as C, C++, Java, assembler, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing. Terms such as "mechanism," "element," "means" and "configuration" may be used broadly and are not limited to mechanical and physical elements. The terms may include the meaning of a series of routines of software in association with a processor or the like.

The above-described example embodiments are merely examples, and other embodiments may be implemented within the scope of the claims to be described later.

What is claimed is:

1. A method for evaluating responses, comprising:
based on a training dataset comprising a plurality of training contexts and training responses corresponding to the plurality of training contexts respectively, obtaining cluster classifying information for the training responses;
obtaining a plurality of test responses by inputting a plurality of test contexts into a dialogue generation model;
obtaining semantic vectors for the plurality of test responses using a trained language model;
classifying the semantic vectors for the plurality of test responses into one or more clusters respectively based on the cluster classifying information;
evaluating semantic diversity for responses of the dialogue generation model based on a distribution of the one or more clusters to which the plurality of test responses are classified, wherein
the evaluating includes
calculating a distribution probability corresponding to each of the one or more clusters into which the plurality of test responses are classified,
calculating semantic entropy values for the responses of the dialogue generation model based on each distribution probability, and
evaluating relative semantic diversity for the responses of the dialogue generation model among a plurality of models according to the semantic entropy values, and
the dialogue generation model is trained at least in part based on a weight value calculated for each of a plurality of clusters into which the training responses are classified.

2. The method of claim 1, wherein each of the plurality of test responses is an embedding vector corresponding to each utterance of each test context, and
each of the semantic vectors for each of the plurality of test responses is a vector in a latent vector space having each axis as a plurality of evaluation scales for semantic diversity.

3. The method of claim 1, wherein the obtaining cluster classifying information comprises:
  obtaining the training dataset;
  obtaining semantic vectors for the training responses using a trained language model; and
  classifying the semantic vectors for the training responses into one or more clusters respectively using a set classifying algorithm.

4. The method of claim 3, wherein the classifying the semantic vectors for the training responses comprises classifying the semantic vectors for the training responses into a preset k number of clusters using a k-means clustering algorithm.

5. The method of claim 1, wherein the classifying the semantic vectors for the plurality of test responses comprises classifying the semantic vectors for the plurality of test responses into any one of the plurality of clusters to which the training responses are classified, using a mapping function that maps an input vector and the cluster classifying information.

6. The method of claim 1, wherein calculating the distribution probability comprises:
  calculating a distribution probability corresponding to one cluster by comparing a total number of responses output by the dialogue generation model with a number of responses belonging to the one cluster.

7. The method of claim 1, wherein calculating the semantic entropy values comprises:
  multiplying each distribution probability by a log value for each distribution probability;
  summing multiplied values for each of the one or more clusters to which the plurality of test responses are classified; and
  outputting the semantic entropy values by adjusting a sign of summed values.

8. The method of claim 1, wherein evaluating the relative semantic diversity comprises providing a more favorable evaluation of the relative semantic diversity for the responses of the dialogue generation model as a semantic entropy value increases, and providing a less favorable evaluation of the relative semantic diversity for the responses of the dialogue generation model as a semantic entropy value decreases.

9. The method of claim 1, wherein the semantic diversity for responses of the dialogue generation model is output to an input/output interface.

10. A non-transitory, computer readable recording medium on which a program for performing a method according to claim 1 is recorded.

11. An apparatus for evaluating responses, comprising:
  an input/output interface;
  a memory for storing instructions; and
  a processor,
  wherein the processor, connected to the input/output interface and the memory, is configured to
    based on a training dataset comprising a plurality of training contexts and training responses corresponding to the plurality of training contexts respectively, obtain cluster classifying information for the training responses;

18 obtain a plurality of test responses by inputting a plurality of test contexts into a dialogue generation model;
    obtain semantic vectors for the plurality of test responses using a trained language model;
    classify the semantic vectors for the plurality of test responses into one or more clusters respectively based on the cluster classifying information;
    evaluate semantic diversity of the dialogue generation model based on a distribution of the one or more clusters to which the plurality of test responses are classified, wherein
    the processor, in evaluating semantic diversity of responses from the dialogue generation model, is configured to
      calculate a distribution probability corresponding to each of the one or more clusters into which the plurality of test responses are classified,
      calculate semantic entropy values for the responses of the dialogue generation model based on each distribution probability, and
      evaluate relative semantic diversity for the responses of the dialogue generation model among a plurality of models according to the semantic entropy values, and
    the dialogue generation model is trained at least in part based on a weight value calculated for each of a plurality of clusters into which the training responses are classified.

12. The apparatus of claim 11, wherein the processor, in obtaining the cluster classifying information, is configured to:
  obtain the training dataset;
  obtain semantic vectors for the training responses using a trained language model; and
  classify the semantic vectors for the training responses into one or more clusters respectively using a set classifying algorithm, and
  the classifying the semantic vectors for the plurality of test responses is classifying the semantic vectors for the plurality of test responses into any one of the plurality of clusters to which the training responses are classified, using a mapping function that maps an input vector and the cluster classifying information.

13. The apparatus of claim 11, wherein the processor, in calculating the semantic entropy values, is configured to:
  multiply each distribution probability by a log value for each distribution probability;
  sum multiplied values for each of the one or more clusters to which the plurality of test responses are classified; and
  output the semantic entropy values by adjusting a sign of summed values.

14. The apparatus of claim 11, wherein the semantic diversity of the dialogue generation model is output to the input/output interface.

* * * * *